United States Patent [19]

Van Dyke

[11] Patent Number: 4,736,417
[45] Date of Patent: Apr. 5, 1988

[54] ADJUSTABLE TELEPHONE HANDSET SUPPORT

[76] Inventor: Lyle H. Van Dyke, 4411 S.W. Twombly Ave., Portland, Oreg. 97201

[21] Appl. No.: 948,474

[22] Filed: Dec. 29, 1986

Related U.S. Application Data

[63] Continuation of Ser. No. 710,412, Mar. 11, 1985, abandoned.

[51] Int. Cl.$^4$ .................... H04M 1/04; F16C 11/04; G05G 5/06
[52] U.S. Cl. .................... 379/449; 74/527; 379/454; 403/97
[58] Field of Search ............... 379/449, 447, 454, 441, 379/430; 403/97; 74/527

[56] References Cited

U.S. PATENT DOCUMENTS

| | | | |
|---|---|---|---|
| 2,348,138 | 5/1944 | Latus et al. | 379/449 |
| 2,488,181 | 11/1949 | Fallek | 379/449 |
| 2,602,863 | 7/1952 | Raymond et al. | 403/97 |
| 2,640,111 | 5/1953 | Samsky et al. | 379/449 |
| 2,644,043 | 6/1953 | Zakos | 379/449 |
| 2,685,331 | 8/1954 | Gauntlett et al. | 403/97 |
| 2,785,234 | 3/1957 | Del Busto | 379/449 |
| 2,802,062 | 8/1957 | Dalton | 379/449 |
| 2,804,510 | 8/1957 | Sanford | 379/449 |
| 2,816,963 | 12/1957 | Norton | 379/449 |
| 2,822,433 | 2/1958 | Sanford | 379/449 |
| 3,025,360 | 3/1962 | Van Dyke | 379/449 |
| 3,176,087 | 3/1965 | Schetzer | 379/430 |
| 3,277,601 | 10/1966 | Ryan | 403/97 |
| 3,347,998 | 10/1967 | Cunningham | 379/449 |
| 3,830,987 | 8/1974 | Van Dyke | 379/449 |
| 4,058,689 | 11/1977 | Stebinger | 379/449 |
| 4,241,242 | 12/1980 | Yeh et al. | 379/449 |
| 4,406,040 | 9/1983 | Cannone | 403/97 |

FOREIGN PATENT DOCUMENTS

266255  3/1964  Australia .................... 179/157

OTHER PUBLICATIONS

Machine Digest, vol. 31, No. 43, Oct. 27, 1960, p. 144.

Primary Examiner—Jin F. Ng
Assistant Examiner—Danita R. Byrd
Attorney, Agent, or Firm—Stanley R. Moore

[57] ABSTRACT

Apparatus for supporting a telephone handset on the user's shoulder while leaving the hands free for other tasks in which a new and improved adjustment mechanism is provided. The handset support includes a shoulder rest; a support member attached to the shoulder rest, said support member having a first multiplicity of raised teeth arranged in a circular pattern about a central opening; a cradle member for supporting the telephone handset, said cradle member having a second multiplicity of raised teeth arranged in a circular pattern about a central protuberance having an axial opening therein, whereby said second multiplicity of teeth may complementarily engage with said first multiplicity of teeth and said central protuberance may complementarily engage with the central opening; and attachment means for passing through said central opening and engaging the axial opening in said the central protuberance.

8 Claims, 1 Drawing Sheet

ADJUSTABLE TELEPHONE HANDSET SUPPORT

CROSS REFERENCE TO RELATED APPLICATION

This application is a continuation application of copending application Ser. No. 710,412 entitled "Adjustable Telephone Handset Support", filed Mar. 11, 1985, and now abandoned.

BACKGROUND OF THE INVENTION

The invention relates to new and useful improvements in telephone handset supports.

There are many situations in which it is desirable to use a telephone while keeping the hands free to perform other tasks. This need has been met by the telephone handset support, which in general supports a telephone handset adjacent the ear and mouth by means of a curved base member placed on the shoulder. Examples of such supports are disclosed in several prior patents including the applicant's own U.S. Pat. Nos. 3,025,360 and 3,830,987.

Such handset supports often include some facility adjusting the angle at which the handset is held in order to accomodate the physical characteristics of various users. Usually this is in the form of a rotatable connection tightened by a screw as in applicant's U.S. Pat. No. 3,830,987 or a ridged rosette as shown in U.S. Pat. No. 2,640,111 to Samsky et al., also tightened by a screw.

It is therefore applicant's primary object in the present invention to provide new and useful improvements in the manner in which telephone handset supports are adjusted to suit individual users.

It is another object of the present invention to provide a new and improved adjustable telephone handset support that resists slippage in the adjustment mechanism.

It is a further object of the present invention to provide an adjustable telephone handset support that permits adjustment in fixed increments.

It is yet another object of the present invention to provide an adjustable telephone handset support permitting quick and easy adjustment.

SUMMARY OF THE INVENTION

With these and other objects in view, the present invention provides a telephone handset support having a shoulder rest and a member adapted to be attached to the handset. The member has a pair of surfaces in moveable angular relation to each other, and each surface has thereon a multiplicity of hexahedrally shaped teeth for complementary engagement. Means are also provided for releasably securing the member surfaces together with the teeth in engagement. That is, when considering the base and top surfaces or faces of the teeth as constituting two surfaces, the teeth have six sides or surfaces.

BRIEF DESCRIPTION OF THE DRAWINGS

The invention may be more fully understood by reading the following description of a preferred embodiment of the invention in conjunction with the appended drawings wherein.

DETAILED DESCRIPTION OF A PREFERRED EMBODIMENT

Figure 1:
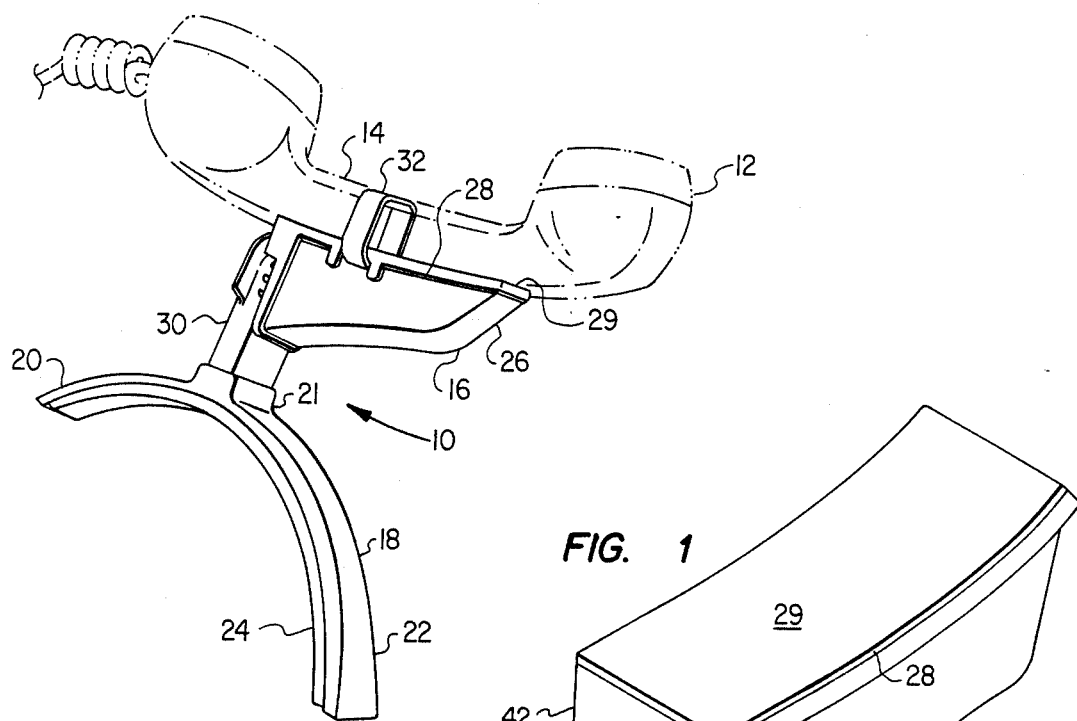
FIG. 1 is an isometric view of the telephone handset support of the present invention with an attached telephone handset shown in phantom.

Referring first to FIG. 1, support 10 is attached to a conventional telephone handset 12 having the usual handle 14. Support 10 includes a body or attachment member 16 for attachment to handle 14 of handset 12 and a shoulder rest 18 which is in the form of an arced or curved cradle member having legs 20 and 22 for overlying the front and back portions of the shoulder of a user. Shoulder rest 18 has a square boss 21 on the convex side thereof for mating with support member 30 as hereinafter described. Preferably, the attachment member 16 and shoulder rest 18 are formed of plastic or other material capable of being molded. A coextensive pad 24 of soft rubber or other suitable cushioning material overlies and is secured to the inner, curved surface of shoulder rest 18.

Attachment member 16 includes a cradle member 26 having a concave arcuate upper surface 28 to mate with curved handle 14 of handset 12 and the support member 30. The support member 30 is perpendicularly attached to both cradle member 26 and shoulder rest 18 (substantially as shown). Upper surface 28 is preferably coextenively covered by a pad 29 of soft rubber or other suitable cushioning material. Handset 12 is secured to cradle member 26 by means of a strap, or the like, 32. Cradle member 26 may be rotated along its longitudinal dimension with respect to support member 30, as hereinafter described, to customize the handset support angle to the needs of the user.

Figure 2:
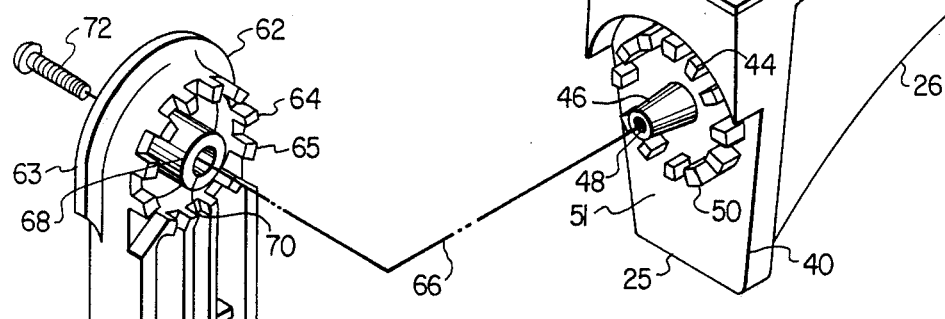
FIG. 2 is an exploded isometric view of the attachment member of the present invention illustrating the angle adjustment mechanism.

Referring next to FIG. 2, the end of cradle member 26 which engages support member 30 is formed as an essentially flat end plate 40 offset from another flat section 42 by means of a arcuate recess 44. End plate 40 is essentially perpendicular to top surface 28 of cradle member 26 and has a projection or protuberance 46 located at essentially the center of arcuate recess 44. Protuberance 46 is frustro-conical in shape and has a central, threaded axial opening, or hole, 48 to receive a screw, or other fastener, as hereinafter descirbed. Disposed about protuberance 48 in a circular pattern is a multiplicity of equidistantly-spaced, hexahedrally-shaped, raised teeth 50, forming a ratchet ring 51. In cross-section parallel to end plate 40, each of teeth 50 is inwardly-tapered substantially in the shape of an isosceles trapezoid the projection of whose two non-parallel sides intersect at the center of protuberance 46. Teeth 50 are also tapered toward their tops forming a cross-section in the shape of an isosceles trapezoid when taken perpendicular to a radius drawn from protuberance 46.

Figure 3:
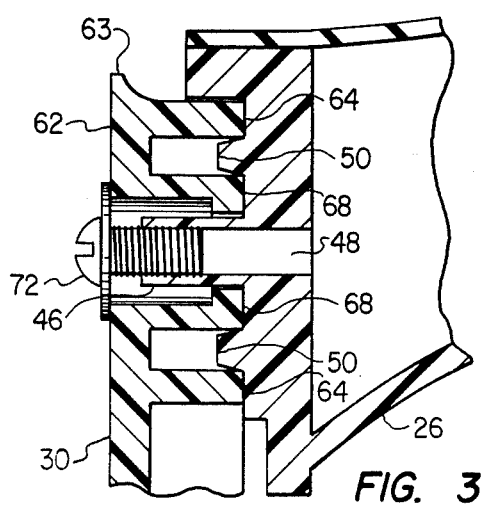
FIG. 3 is an orthagonal partial cross-sectional view of the attachment member shown in FIG. 2, illustrating in particular the adjustment mechanism.

Support member 30 is generally elongated and has a semicircular head 62 partially overlaid by an integral semicircular flange. Projecting teeth 64 are formed in a circular pattern at the end of head 62 forming a second ratchet ring 65 which constitutes one-half of a ratchet mechanism. Teeth 64 are similar in shaped to teeth 50 on cradle member 26 and are arranged to complementarily mate therewith when cradle member 26 and support member 30 are brought together as indicated by the center line 66 and as illustrated in FIG. 3. Ratchet rings 51 and 65 coact when brought into their aforementioned complementary relationship to permit a multiplicity of angular relationships between cradle section 26 and support 30. Although teeth 50 and 64 have been described as having a particular shape, it should be understood that any shape may be used so long as it provides for positive locking and permits complementary coaction between ratchet rings 51 and 65.

At the origin of the circular pattern formed by teeth 50 is a protuberance 68 having an axial opening 70 having a frustro-conical shape to receive protuberance 46 on cradle member 26. Axial opening 70 is extended completely through support member 30 as a bore (not shown) to receive a screw, or other attachment means, 72 which engages threaded axial opening 48 in protuberance 46 when cradle member 26 and support member 30 are brought into engagement as illustrated in FIG. 3.

The other end of support member 30 is provided with protuberances 74 and 76 and a key tab 78 to engage mating voids in boss 21 on shoulder rest 18 (not shown). Support member 30 and shoulder rest 18 may be secured together by means of screws which pass through holes in boss 21 and engage threaded axial openings in protuberances 74 and 76.

Figure 4:
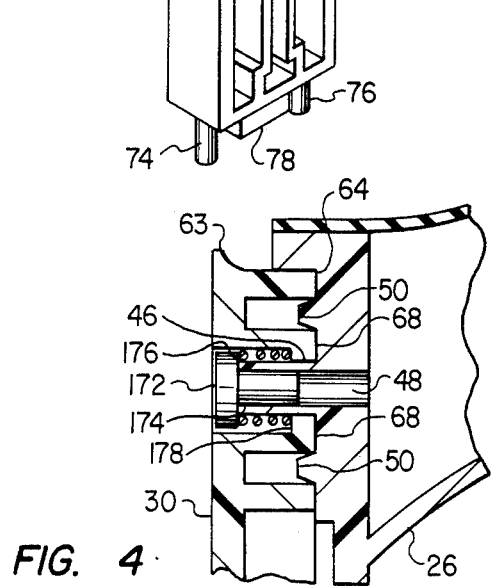
FIG. 4 is an orthagonal partial cross-sectional view of the attachment member shown in FIG. 2, illustrating an alternative embodiment of the adjustment mechanism.

Referring to FIG. 4, the cradle member 26 and support member 30 may be secured together by means of a stud 172 whose shank 174 is sized to be press fitted into bore 48 in protuberance 46. A spring 176 is positioned about protuberance 46 between the lip 178 formed on the distal end of protuberance 68 and and the head of stud 172.

In operation, handset 12 is secured to cradle member 26 by means of strap 32 and the shoulder rest is placed on the user's shoulder. If adjustment of the angle at which handset 12 is held by cradle member 26 is required, screw 72 is loosened, and teeth 50 on cradle member 26 and teeth 64 on support member 30 are moved out of engagement along center line 66. Cradle member 26 is then rotated along center line 66 relative to support member 30 until the desired angle is achieved. Teeth 50 and 64 are then re-engaged, and screw 72 is retightened.

In the alternative embodiment illustrated in FIG. 4, adjustment of the handset holding angle is accomplished by pulling cradle member 26 away from support member 30 in the direction of the axis of hole 48. This movement compresses spring 176 and permits teeth 64 to clear teeth 50. Cradle member 26 is then rotated along center line 66 relative to support member 30 until the desired angle is achieved. Cradle member 26 and support member 30 are then released, permitting spring 176 to force teeth 64 and teeth 50 back into engagement.

While particular embodiments of the present invention have been shown an described, it is obvious that minor changes and modifications may be made therein without departing from the true scope and spirit of the invention. It is the intention in the appended claims to cover all such changes and modifications.

What is claimed is:

1. A telephone handset support for supporting a telephone handset on a shoulder of a user and for facilitating angular adjustment through longitudinal rotation of the handset relative to the user's shoulder, the handset support comprising:

an arcuate shaped shoulder rest; and body means connected to the shoulder rest so as extend upwardly therefrom for supporting the handset, said body means comprising:

a cradle member having an arcuate-shaped recess formed in one end thereof;

a first protuberance substantially centrally disposed in the arcuate-shaped recess of the cradle member, the first protuberance having a substantially centrally disposed bore;

a plurality of equidistantly-spaced first raised teeth disposed in a circular pattern about the first protuberance, the first raised teeth forming a first ratchet ring;

an elongated support member having a semi-circular head portion partially overlaid with an integrally formed flange;

a second protuberance substantially centrally disposed in the head portion of the support member, the second protuberance having an opening therein adapted to receive the first protuberance;

a plurality of equidistantly-spaced second raised teeth disposed in a circular pattern about the second protuberance, the second raised teeth forming a second ratchet ring adapted to matingly engage with and disengagement from the first ratchet ring;

first connecting means for connecting the cradle member to the handset; and second connecting means for releasably connecting the cradle member to the support member in a predetermined position wherein the first and second ratchet rings are matingly engaged and the first protuberance is disposed within the bore of the second protuberance.

2. A telephone handset support of claim 1 wherein said first and second raised teeth forming said first and second ratchet rings are hexahedral in shape and adapted for facilitating slidable engagement from the disengaged position.

3. A telephone handset support of claim 1 wherein said first and second raised teeth forming said first and second ratchet rings are trapezoidal in lateral cross-section and adapted for facilitating slidable engagement from the disengaged position.

4. A telephone handset support of claim 3 wherein said first protuberance is frustro-conical in shape.

5. A telephone handset support of claim 2 wherein said first and second raised teeth forming said first and second ratchet rings are bi-tapered.

6. A telephone handset support of claim 5 wherein said first and second raised teeth are tapered inwardly in the direction of the center of said first and second ratchet rings, respectively, and said first and second raised teeth are tapered outwardly in the direction of their respective tops.

7. A telephone handset support of claim 1 wherein the second protuberance is provided with a lip portion at its distal end, and wherein the second connecting means comprises:

a stud member having a head and a shank, the shank being dimensioned to extend through the opening of the second protuberance and to be press fitted into the centrally disposed bore of the first protuberance; and a spring member disposed about the first protuberance so as to be positioned between the lip portion of the second protuberance and the head of the stud, the spring member biasing the first and second ratchet rings in mating engagement and facilitating disengagement therebetween for adjustment of the longitudinal rotational axis of the handset relative to the user through rotation of the cradle member along its longitudinal dimension relative to the support member.

8. A telephone handset support of claim 1 wherein the centrally disposed bore of the first protuberance is threaded, and wherein the second connecting means comprises a screw adapted to extend through the second protuberance and threadedly engage the threaded bore of the first protuberance for connecting the cradle member and the support member in a predetermined position so as to position the handset in a desired position relative to the support member and the shoulder rest.

* * * * *